US006490133B1

(12) United States Patent
Okamura et al.

(10) Patent No.: US 6,490,133 B1
(45) Date of Patent: Dec. 3, 2002

(54) TAPE CARTRIDGE WITH A CELL FOR A LEADER HOOK MEMBER AND A CELL FOR A LEADER

(75) Inventors: Masatoshi Okamura, Tokyo (JP); Hiroshi Kaneda, Tokyo (JP)

(73) Assignee: TDK Corporation, Tokyo (JP)

(*) Notice: Subject to any disclaimer, the term of this patent is extended or adjusted under 35 U.S.C. 154(b) by 62 days.

(21) Appl. No.: 09/657,688

(22) Filed: Sep. 8, 2000

(30) Foreign Application Priority Data

Sep. 9, 1999 (JP) .......................................... 11-255431

(51) Int. Cl.[7] .............................................. G11B 23/07
(52) U.S. Cl. .................. 360/132; 242/332.4; 242/348.2
(58) Field of Search ...................... 360/132; 242/332.4, 242/348, 348.2, 348.3

(56) References Cited

U.S. PATENT DOCUMENTS

| | | | |
|---|---|---|---|
| 4,977,474 A | | 12/1990 | Oishi et al. .................. 360/132 |
| 5,769,346 A | * | 6/1998 | Daly ........................ 242/332.4 |
| 5,927,633 A | | 7/1999 | McAllister ............... 242/348.2 |
| 5,971,310 A | | 10/1999 | Saliba et al. ............. 242/332.4 |
| 6,034,850 A | * | 3/2000 | Del Genio et al. ......... 360/132 |
| 6,079,651 A | * | 6/2000 | Hamming ................ 242/332.4 |
| 6,152,350 A | * | 11/2000 | Hayashi et al. ............. 228/102 |
| 6,236,539 B1 | * | 5/2001 | Morita ........................ 360/132 |

FOREIGN PATENT DOCUMENTS

| | | |
|---|---|---|
| JP | 58-169380 | 10/1983 |
| JP | 62-502641 | 10/1987 |
| JP | 10-188520 | 7/1998 |
| JP | 11-7749 | * 1/1999 |
| WO | WO93/21634 A1 | 10/1993 |

* cited by examiner

Primary Examiner—Jefferson Evans
(74) Attorney, Agent, or Firm—Akin, Gump, Strauss, Hauer & Feld, L.L.P.

(57) ABSTRACT

A tape cartridge includes a single tape reel around which a length of magnetic tape is wound and which is turnably held within a housing. The beginning of the tape is drawn out through an opening formed in the housing by a tape drawing-out member of a recorder. The drawing-out member has an engaging member at the outer end. The housing has a cell in which a hook member to catch an engaging end of a leader tape, when the leader tape holding the beginning of the magnetic tape is used, is detachably fitted and a cell in which a leader member to hold the beginning of the magnetic tape, when the leader member is used, is contained. The housing is made using a mold which forms a cell having a leader member holding the beginning of the magnetic tape or which forms the cell without the leader member.

1 Claim, 10 Drawing Sheets

TAPE CARTRIDGE WITH A CELL FOR A LEADER HOOK MEMBER AND A CELL FOR A LEADER

BACKGROUND OF THE INVENTION

This invention relates to a single-reel type tape cartridge for use with magnetic recording-reproducing apparatus and, more particularly, to improvements in the tape leader of a tape cartridge of this type.

Single-reel type tape cartridges are extensively used in computer backup and other data storage applications for safekeeping. With a tape cartridge of this type, a leader tape or leader member attached to the outer end of a magnetic tape is drawn out by drawing-out means provided in a magnetic recording-reproducing apparatus (hereinafter referred to as a "recorder") or drive, the tape is led through passages in the recorder, and the tape end is fixed to the hub of another reel normally held within the recorder. On conclusion of recording or playback operation the tape is driven backward and withdrawn into the cartridge, until the leader tape is reset in the original position in the cartridge.

Typical of leader members for conventional single-reel type tape cartridges is one (disclosed, e.g., in Japanese Patent Application Kokai No. 58-169380) which comprises a pin, block, etc. secured to a tape end to be caught by a tape drawing-out member of a recorder. Another type uses a leader tape of relatively tough, elastic material which is connected to a magnetic tape end and has a hole at its own outer end adapted to be engaged with a corresponding hook of a drawing-out member of a recorder which too is formed of a relatively tough, elastic material (Japanese Patent Application Kokai No. 10-188520). When the cartridge incorporating the latter is not in use, the leader tape is held within the cartridge housing and the engaging hole of the leader tape is engaged with a hook inside the housing.

FIG. 10 is an exploded view of a conventional single-reel type cartridge 103 described in the specification of the above-mentioned Patent Application Kokai No. 10-188520. A housing of the cartridge including an upper casing 101 and a lower casing 102 is shown containing a single tape reel 107 which has an upper flange 104 and a lower flange 105, the tape reel 107 being normally biased toward the lower door lock member 102 by a compression spring 108. A leader tape 109 is spliced to the outer end of a length of magnetic tape 106 wound round a hub (not shown) of the upper flange 104 of the tape reel 107. The tape reel 107 has a bearing (not shown) on a ring which is press fitted in an annular recess (not shown) formed in the center of the upper flange 104. With a reel shaft (not shown) fitted in the bearing, the reel can revolve around the shaft. The upper flange 104 of the tape reel 107 has a serration 114 formed along its circumference. On the other hand, a pair of brake members 112, 113 are provided on the inner surface 101a of the upper casing 101 and are normally biased toward the serration 114 by torsion coil springs 110, 111, with cogs 115, 116, respectively, of the brake members 112, 112 adapted to be in mesh with the serration to keep the tape reel from revolution when the cartridge is not in use. When the cartridge is on standby the magnetic tape 106 is wound up on the tape reel 107, and an engaging hole formed at the end of the leader tape 109 is engaged with a hook 117 located close to a side wall of the cartridge housing 103. An opening through which the magnetic tape 106 is drawn out from the cartridge housing 103 is normally closed by a lid 118 which is openable with respect to the cartridge housing.

For use, the cartridge is loaded into a recorder, and the brake members 112, 113 are automatically set free and the tape reel 107 is lifted against the urging of the compression spring 108 to a position free to turn. At the same time, the lid 118 is opened by means provided for that purpose in the recorder.

The tape drawing-out member on the part of the recorder then enters the housing through the opening to be engaged with the hole of the leader tape 109 and draws out the magnetic tape together with the leader tape 109 in the manner described above, so that the tape is threaded in the route within the recorder. When the cartridge is not in use, the magnetic tape is housed within the cartridge and the leader tape is wound up too, with its engaging hole engaged with the hook 117.

The leader tape 109 is made using a thick spring sheet of tough synthetic resin such as polyethylene terephthalate (PET). As FIGS. 11(a) to 11(c) indicate, a hole 128 is formed at the end of the tape so as to be engaged with a tab 121 (serving as a hook) formed at the end of a tape drawing-out member 122 of the recorder. The hole 128 has an angular cutout 123 to ensure positive engagement with the tab 121, with a neck of the drawing-out member that supports the tab 121 fitted in the cutout. FIGS. 11(a) to 11(c) show a sequence of the stages in which the drawing-out member 122 is progressively engaged with the leader tape 109 as the drawing-out member enters the cartridge.

The tape drawing-out mechanism of the prior art causes the following problem. The tape drawing-out member 122 of the recorder, as shown in FIGS. 11(a) to 11(c), is in the form of a tape connected to a reel provided in the recorder, with the tape end having the tab 121 adapted to be engaged with the hole 128 of the leader tape in the tape cartridge. Since the end portions of the leader tape and the drawing-out member 122 of the recorder are both tape-shaped, they are susceptible to curling. When they both curl, it becomes sometimes impossible for the tape drawing-out member 122 of the recorder to engage the leader tape 109 of the cartridge loaded in the recorder.

On the other hand, direct coupling of the end of a magnetic tape to a tough leader member without the aid of a leader tape would stabilize the actions of drawing out and drawing in of the magnetic tape. Such a leader member, as illustrated in FIG. 1, comprises a center pin member 91 in the form of a pin on which a tape end is wound and secured in place by clamping, and a pair of engaging members 92, 92 fixed at one ends to the upper and lower end of the pin member 91. On the sides of the engaging members 92, 92 facing each other, there are formed engaging recesses 92-1, 92-2 in mirror symmetry (see FIG. 9) adapted to engage a pin or casing of a recorder. The center pin member 91 is made of metal and the engaging members 92, 92 are made of plastic.

Users generally desire to enjoy recording and playback with both tape cartridges using a leader tape and a leader member on one and the same drive device. On the other hand, tape cartridge manufacturers commonly desire to minimize the investment in equipment to manufacture the two types of tape cassettes.

BRIEF SUMMARY OF THE INVENTION

The tape cartridge according to the present invention is one including a single tape reel around which a length of magnetic tape is wound and which is turnably held within a housing in such a manner that the beginning of the tape is drawn out through an opening formed in the housing by a tape drawing-out member of a recorder, said drawing-out member having an engaging means at the outer end, characterized in that the housing has both a cell in which a hook member to catch an engaging end of a leader tape, when the leader tape holding the beginning of the magnetic tape is used, is detachably fitted and a cell in which a leader member to hold the beginning of the magnetic tape, when the leader member is used, is contained.

In another aspect the tape cartridge according to the invention includes a single tape reel around which a length of magnetic tape is wound and which is turnably held within a housing in such a manner that the beginning of the tape is drawn out through an opening formed in the housing by a tape drawing-out member of a recorder, said drawing-out member having an engaging means at the outer end, said housing having a cell in which a hook member to catch an engaging end of a leader tape holding the beginning of the magnetic tape is detachably fitted, characterized in that the housing is made using a mold equipped with either a first replaceable mold part for forming a cell in which a leader member holding the beginning of the magnetic tape is contained or a second replaceable mold part that can replace the first mold part but does not form the cell to contain the leader member.

DETAILED DESCRIPTION OF THE INVENTION

The present invention will be described in detail below in conjunction with some preferred embodiments thereof.

Figure 1:
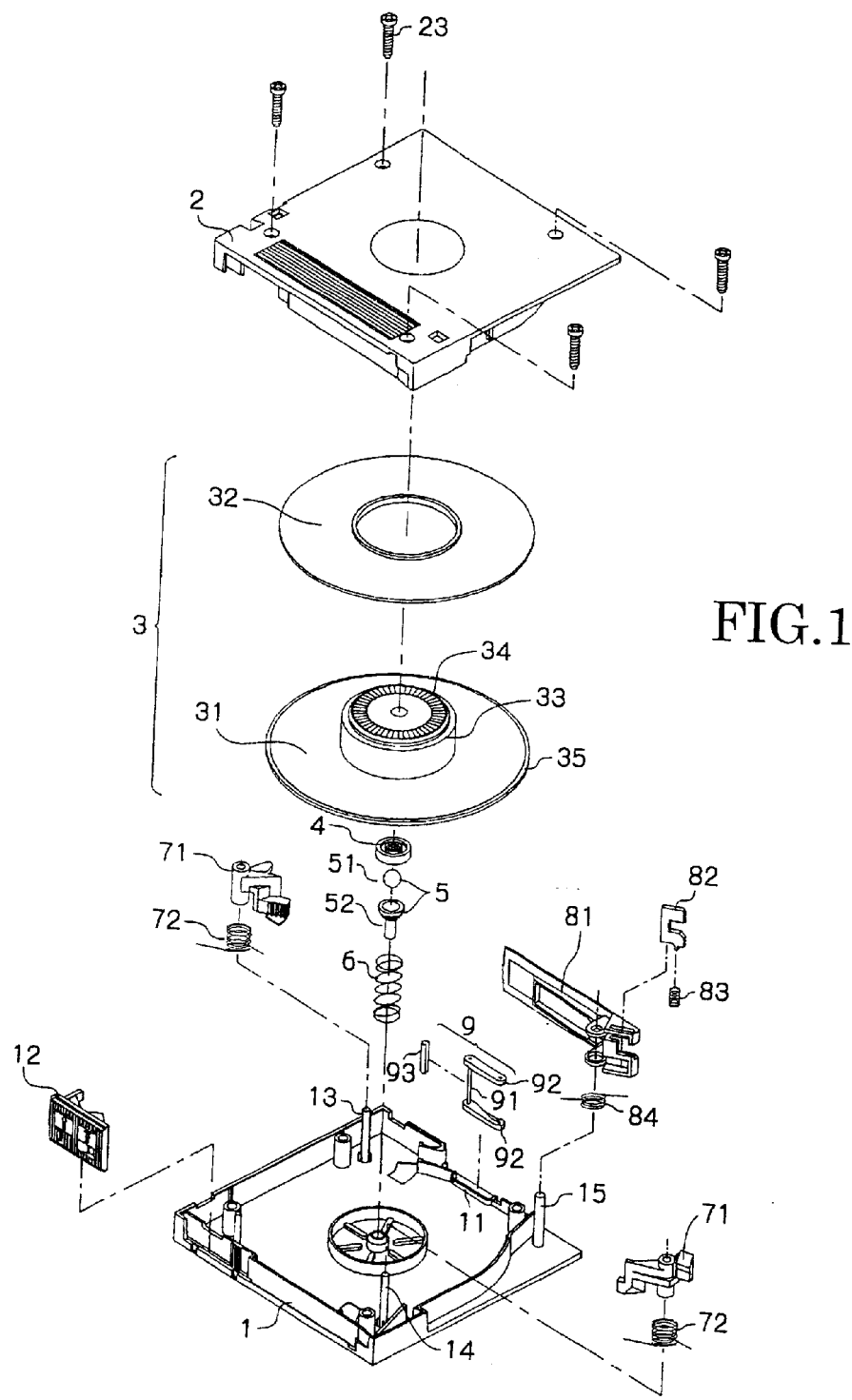
FIG. 1 is an exploded view of a tape cartridge embodying the present invention.

FIG. 1 is an exploded view of an embodiment of the invention.

Referring to FIG. 1, a tape cartridge according to the invention is shown upside down. It illustrates how the parts look in actual assembled operation. A complete cartridge is loaded, in the regular unreversed posture, in a recorder. The cartridge is similar in construction to the cartridge shown in FIG. 4 excepting the leader member and associated parts.

An upper casing 1 and a lower casing 2 are joined close to their corners using setscrews 23 to form a cartridge housing. A reel 3 on which a length of magnetic tape is wound is accommodated in the space inside the housing composed of the upper and lower casings.

The reel 3 consists of an upper flange 31, a hub 33 formed in one piece with the upper flange, and a lower flange 32. The underside of the hub 33 inward of the core on which the tape is wound is closed and is provided with an annular toothed part 34. The upper side of the hub 33 constitutes an open recess which contains a rotational reel support 5 composed of a bearing 4 that smoothens the rotation of the reel, a ball 51 in contact with the center of the bearing 4, and a support member 52 recessed at top to receive the ball. The upper end of the support member 52 is received by a blind hole in the upper casing 1, and a coiled compression spring 6 loosely fitted around the support member normally urges the bearing 4 and the rotational reel support 5 toward the reel.

An irregular surface 35 is formed along the circumference of the upper flange 31, and there are provided two brake mechanisms each composed of one of a pair of pins 13, 14 held upright on two diagonal corners inside the housing, a coiled torsion spring 72, and a brake member 71 with a bore, the spring and brake member being fitted on the pin. When the cartridge is not in use, the two brake mechanisms co-act to engage the brake members 71 with the irregular surface 35 on the circumference of the upper flange 31 so as to keep the reel from unwanted rotation.

The outer end of the tape is fixed to a leader member 9. The leader member 9 is made up of a center pin 91, a pair of engaging members 92 fixed at one end to the upper and lower ends of the pin member, and a clamp 93 for clamping the tape end to the pin 91. The tape end is wound round the center pin 91 and is secured in place with the clamp 93 fitted onto it. The leader member 9 is housed in a recess 11 formed near the inner surface of an opening formed on one side of the housing.

On the outer side of the leader member is fitted a turnable door member 81. The door member 81 is pivotally supported by a pin 15 of the upper casing 1 and is normally biased to a closing position by a torsion coil spring 84 fitted around the pin 15. When the cartridge is not in use, it is locked by a door lock member 82 under downward urging by a compression spring 83. A record defeat member 12 is held in a part of one side of the housing, slidably along that side.

Figure 9A:
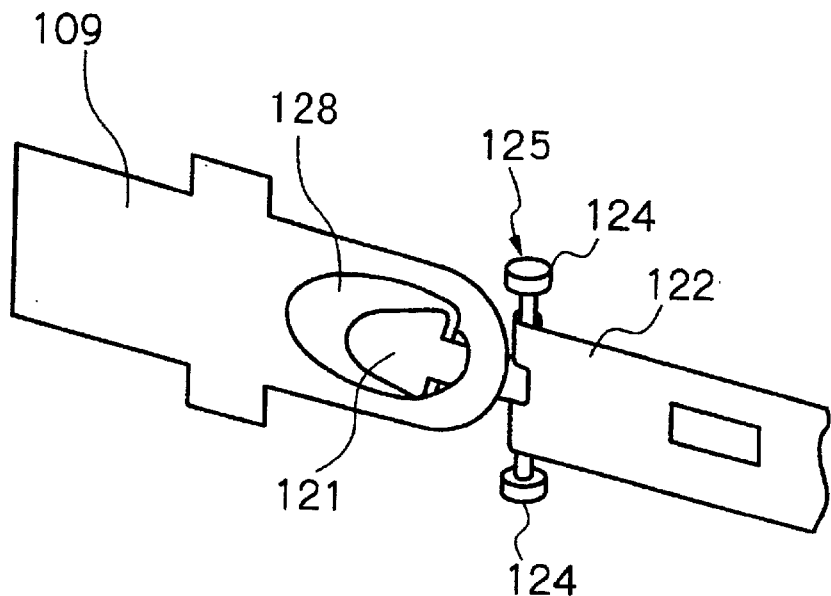
FIG. 9 shows, in perspective, relations between a tape drawing-out member of a recorder of combined type to which the present invention is applicable and the leader tape and the leader member of two different tape cassettes, 9(1) showing the relation of the drawing-out member to the leader tape and 9(b) the relation to the leader member.
Figure 9B:
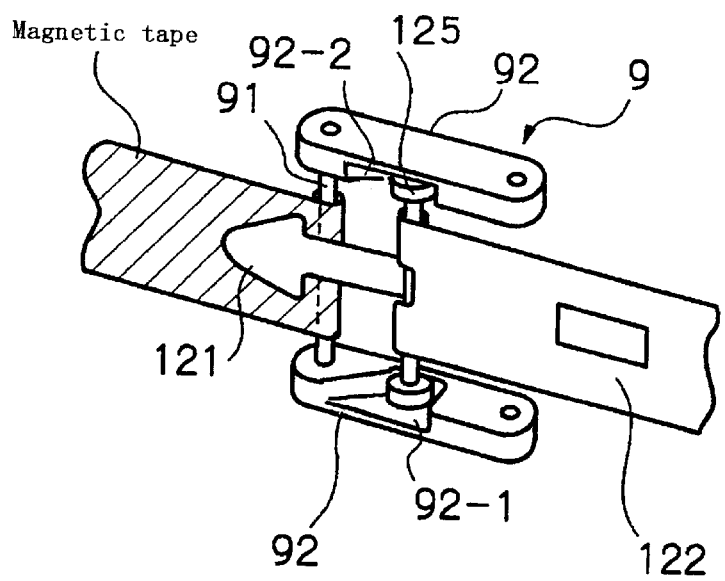
Figure 10:
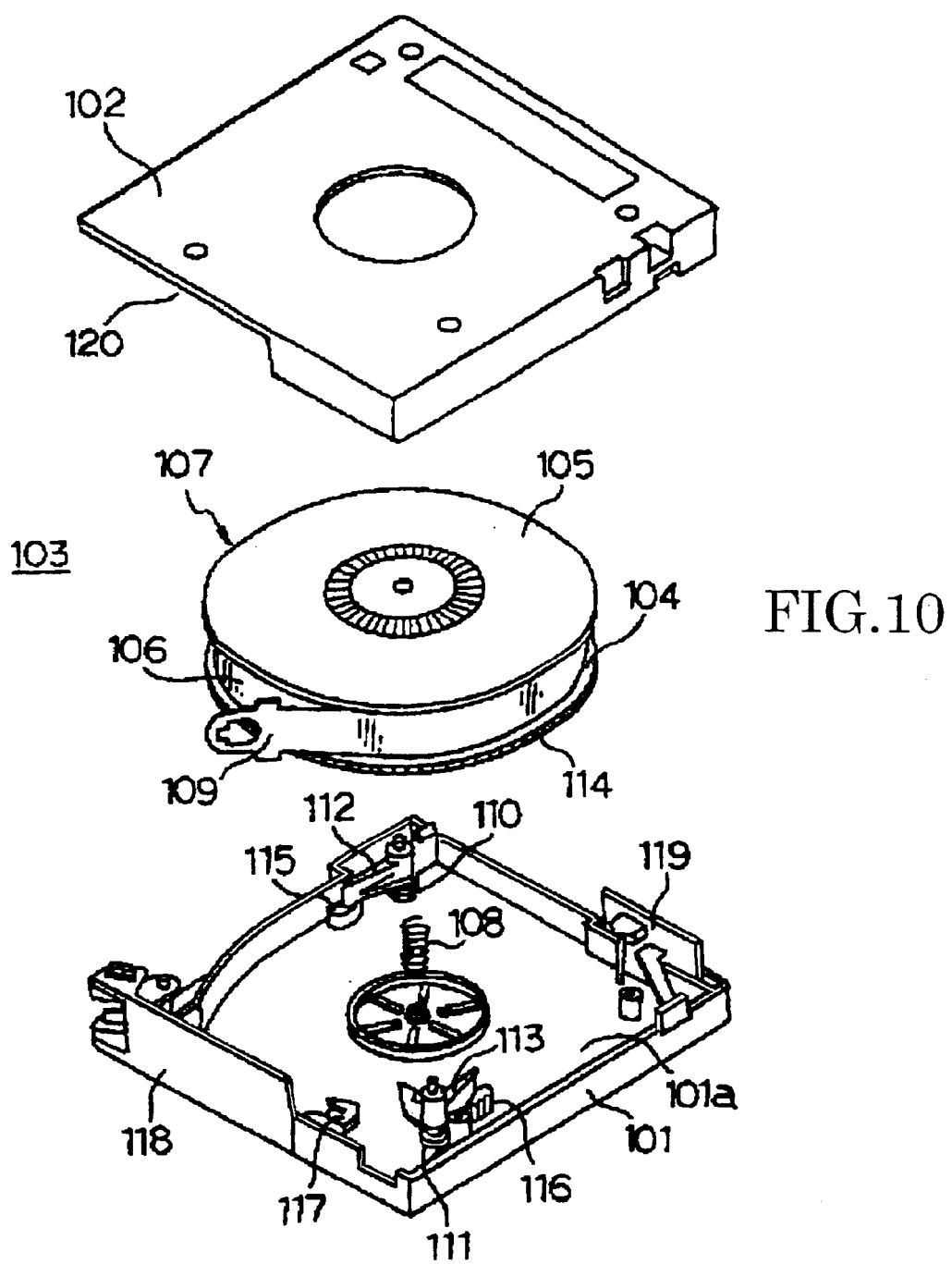
FIG. 10 is an exploded view of a conventional tape cartridge.
Figures 11A, 11B, 11C:
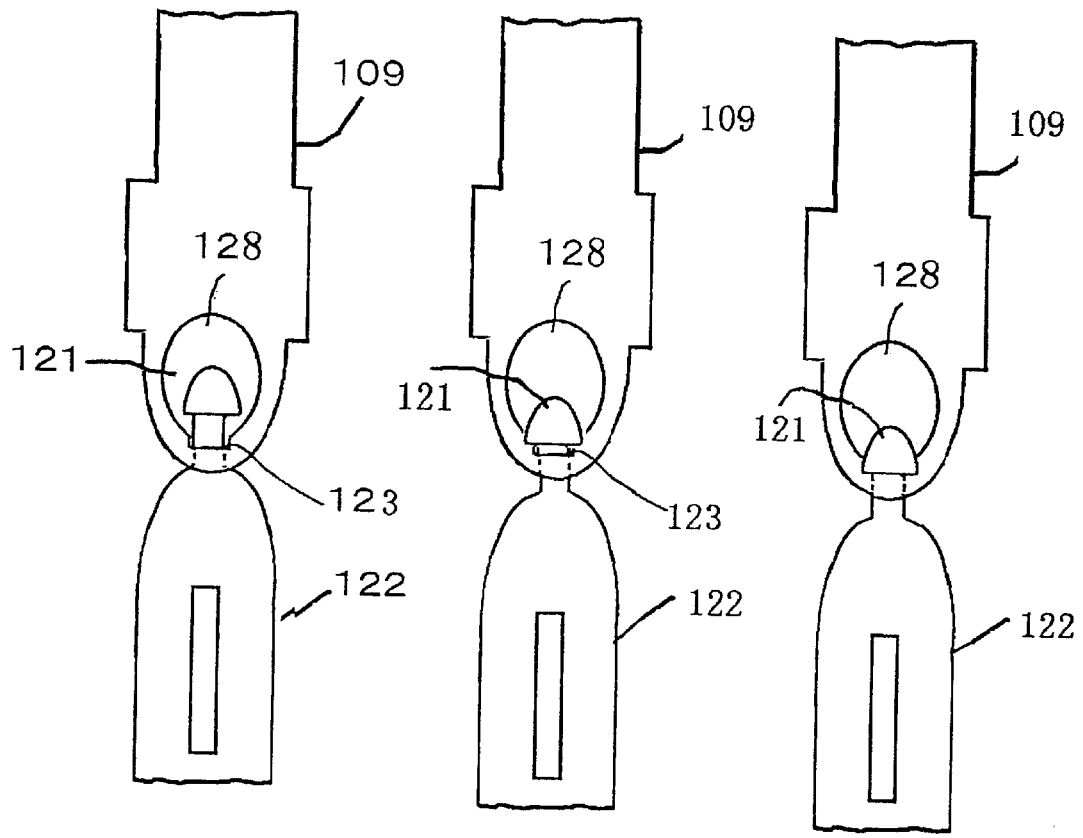
FIGS. 11(a) to 11(c) show ordinary relations between a conventional leader tape and drawing-out member of a recorder, FIGS. 11(a) to 11(c) showing a sequence of movements of the two members into mutual engagement.

For a better understanding of the present invention, the description of the cartridge housing according to the invention will be preceded by an explanation of a leader tape type and a leader member type with reference to FIG. 9. In the illustrated example a tape drawing-out member 122 of a recorder, as shown in FIG. 9(a), has a tab 121 adapted to engage a hole 128 of a leader tape 109. It also has a pin 125, as in FIG. 9(b), which has flanges 124 at both ends adapted to fit in engaging recesses 92-1, 92-2 of engaging members 92 of a leader member 9. The recorder sometimes may use only one of the two leader types.

FIG. 9(a) shows the relation between a tape cartridge of the leader tape type and a drawing-out member. The leader tape 109 has a hole 128 formed at its outer end for engagement purposes, and while it is withdrawn in the tape cartridge, the hole 128 receives a hook member 17 (FIGS. 3 and 4) that comes in the passage for the leader tape 109 (as well as the magnetic tape ). When the drawing-out member 122 of the recorder gains entrance into the cartridge to draw out the magnetic tape, the tab 121 formed at the end of the drawing-out member 122 as shown engages the hole 128 of the leader tape 109 to draw out the leader tape 109.

Figure 5:
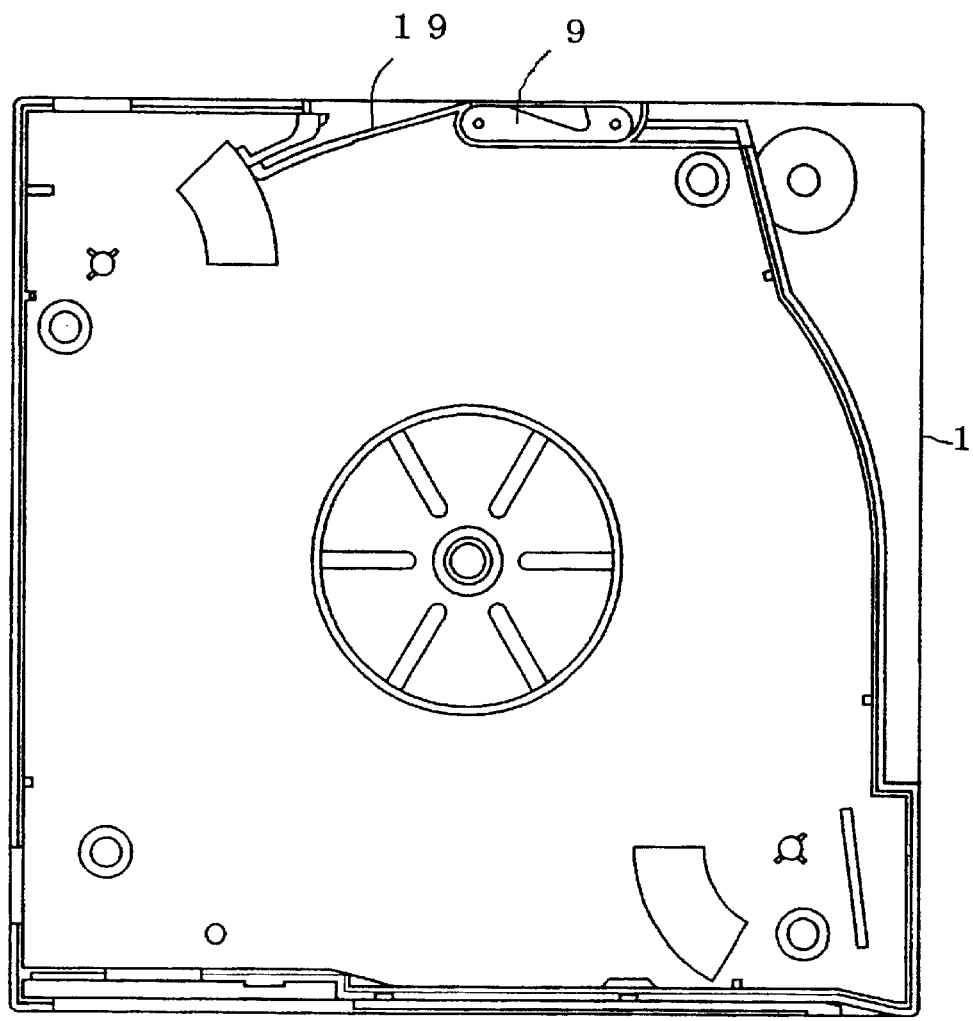
FIG. 5 is a plan view of a combined-type upper casing of the invention, accommodating a leader member.
Figure 6A:
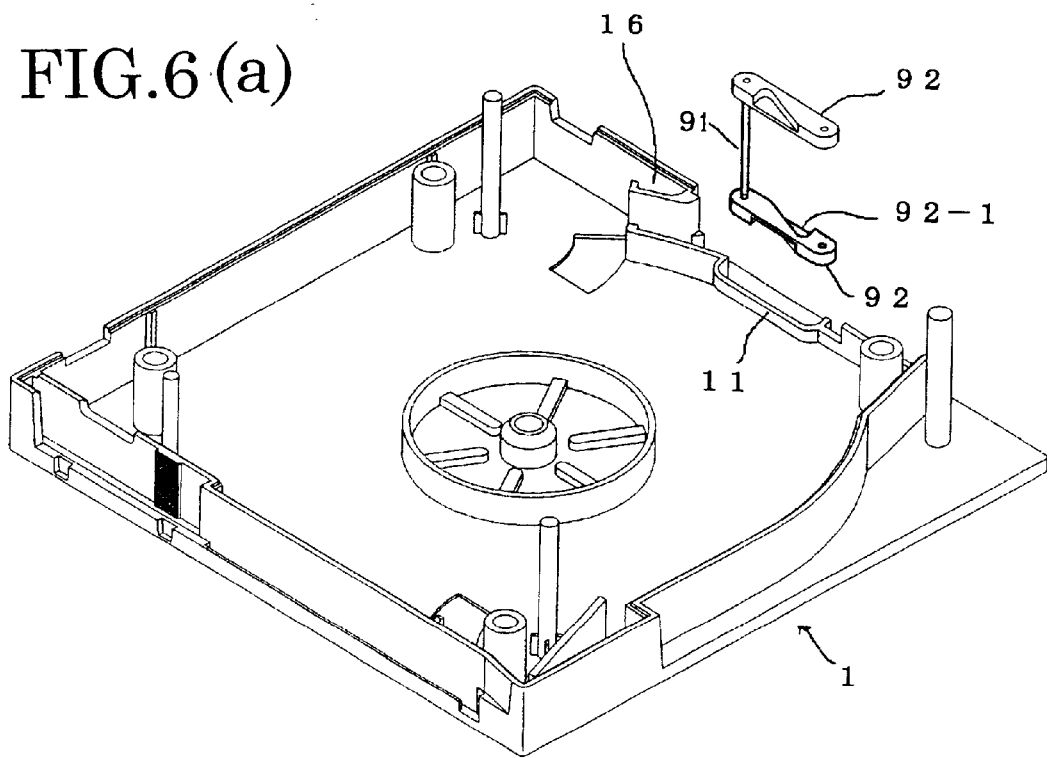
FIG. 6 shows, in perspective, a combined-type upper casing of the invention with a leader member, 6(a) as an exploded view and 6(b) as an assembled view.
Figure 6B:
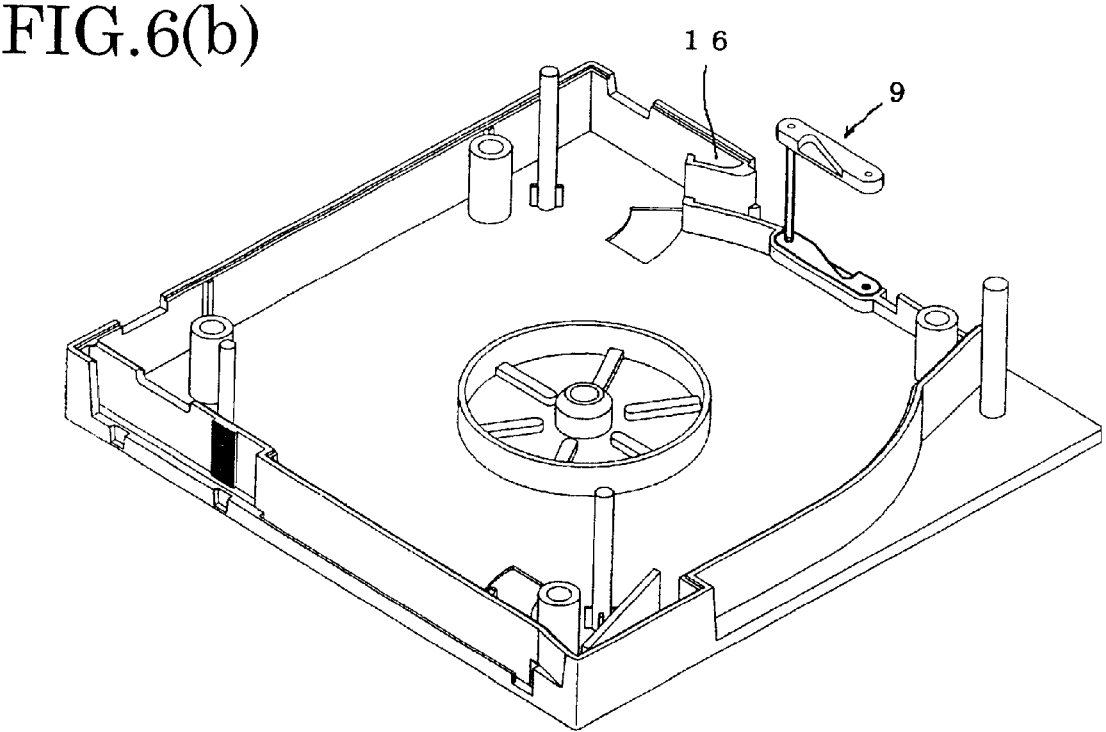

FIG. 9(b) shows the relation between a tape cartridge of the leader member type and a drawing-out member. Here no leader tape is used, and the outer end of the magnetic tape is wound round the center pin member 91 of the leader member 9 and is clamped (93 in FIG. 1) securely. While the tape is withdrawn in the tape cartridge, the leader member 9 is housed in the recess 11 provided for that purpose as indicated in FIGS. 5 and 6. When the drawing-out member 122 enters the cartridge to draw out the magnetic tape, the flanges 124 of the pin 125 provided at the end of the drawing-out member as shown engage the recesses 92-1, 92-2 of engaging members 92 of the leader member type, whereby the leader member 9 is pulled out.

Now, in connection with FIGS. 2 to 6, a housing of a tape cartridge embodying the invention will be explained.

Figure 2:
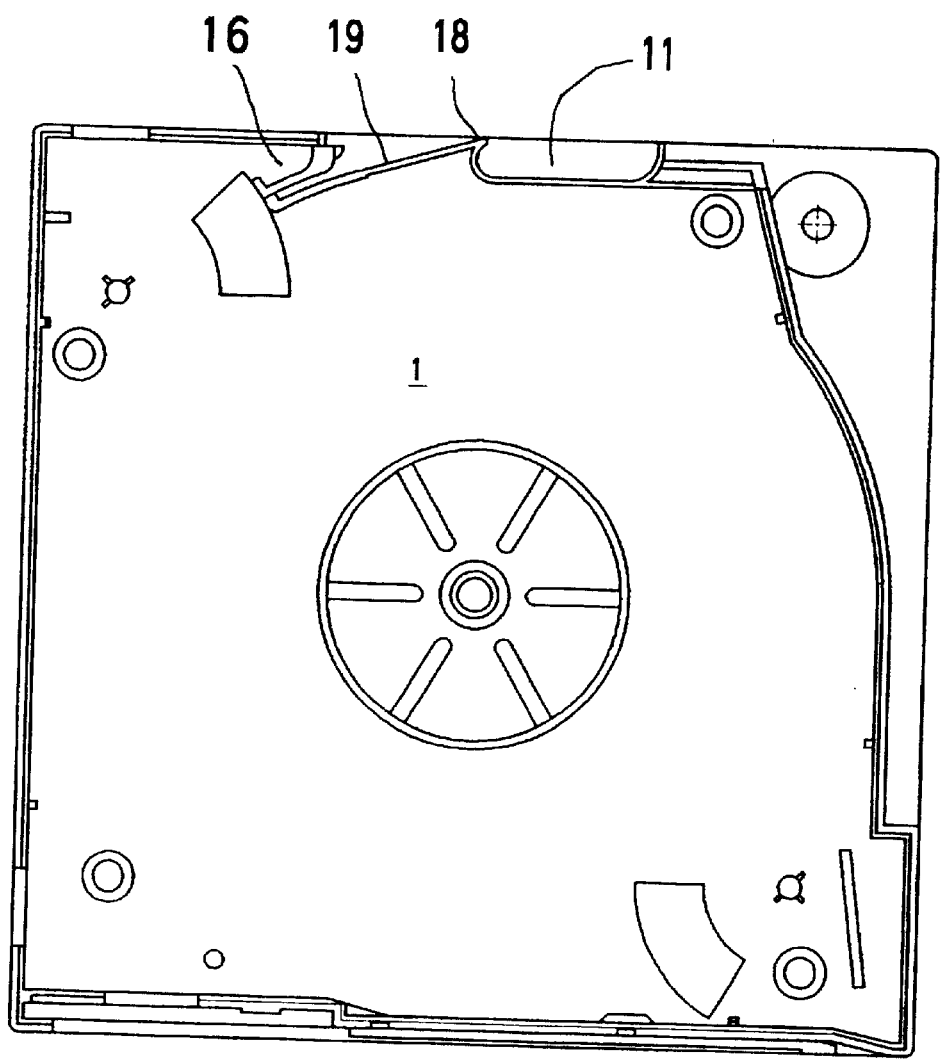
FIG. 2 is a plan view of a combined-type upper casing according to the invention.

Referring to FIG. 2, an upper casing 1 is shown with a guide wall 19 formed close to one side wall to draw out a magnetic tape. A hook cell 16 to hold a hook member 17 is formed opposite to the guide wall. A leader member-containing cell 11 into which one of the engaging members 92 of the leader member 9 fits is formed contiguous to an end of the guide wall. The hook member 17 and the leader member-containing cell 11 are alternatively used, depending on the structure of the member of the recorder that draws out the tape from the cartridge. The combined system thus far described in conjunction with FIG. 9 is applicable to tape cartridges using either the leader tape type or leader member type. The tape cartridge itself has an indication of which type it is designed for.

Figure 3:
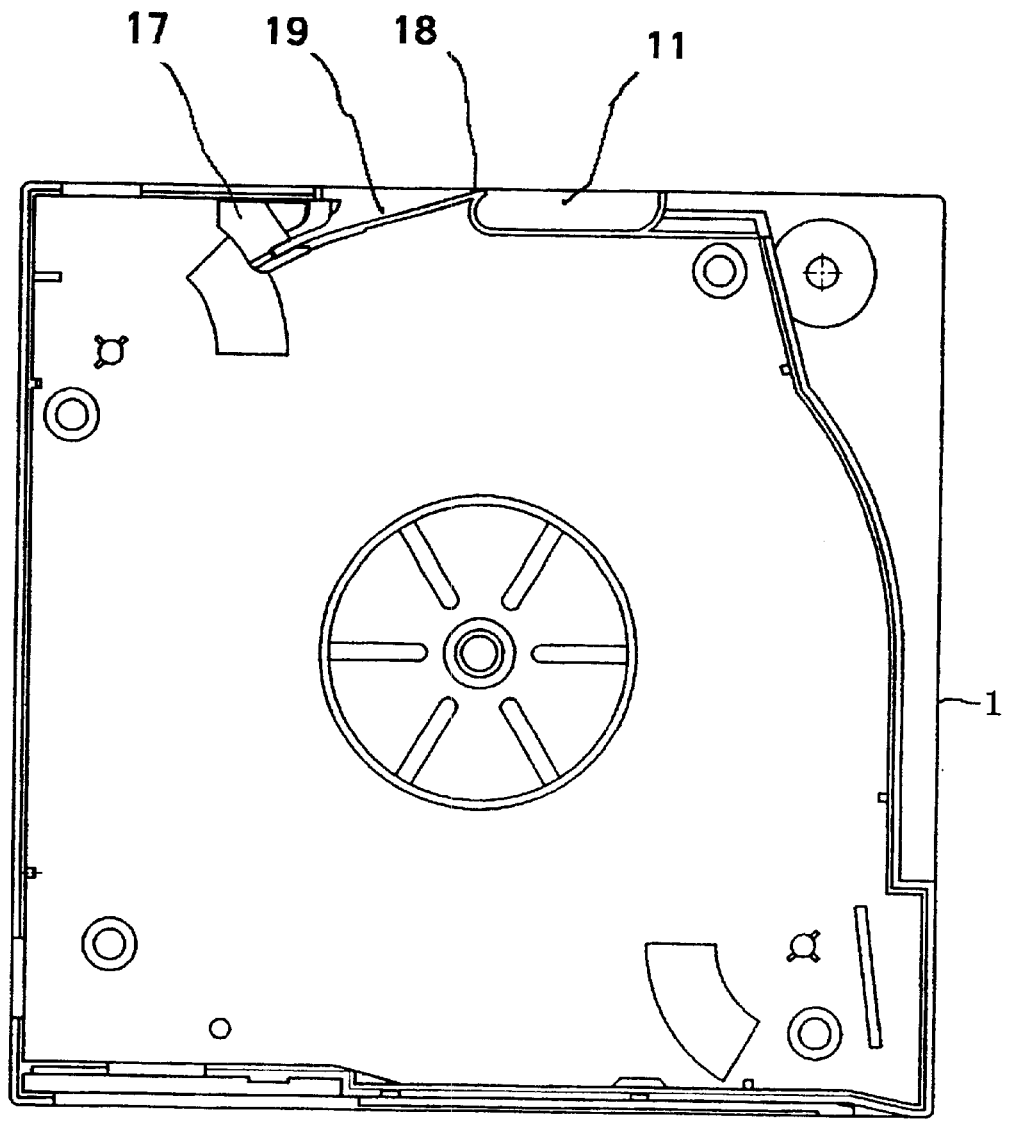
FIG. 3 is a plan view of a combined-type upper casing of the invention, with a hook member fitted in place.
Figure 4A:
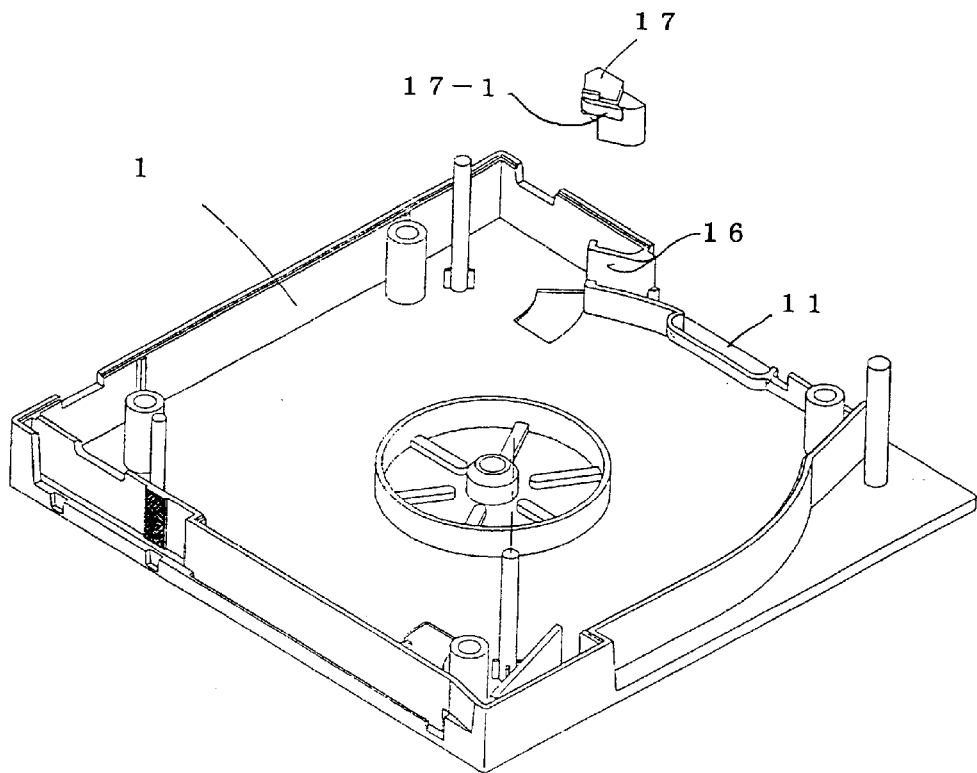
FIG. 4 shows, in perspective, a combined-type upper casing of the invention with a hook member, 4(a) as an exploded view and 4(b) as an assembled view.
Figure 4B:
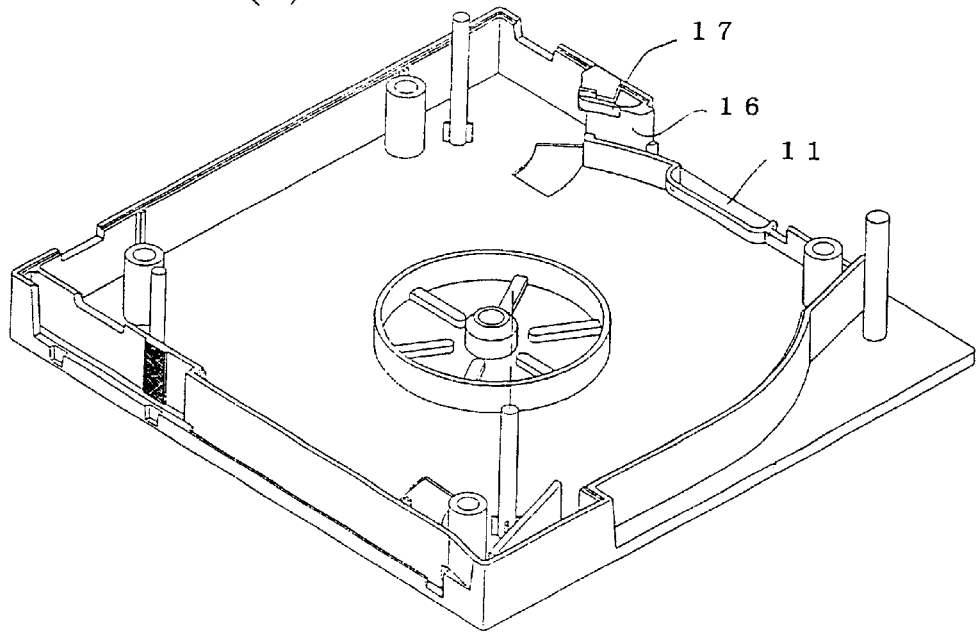

The hook cell 16 comprises a continuous surrounding wall forming a generally triangular space in which the hook member 17 fits snugly. When the housing is to be assembled as a leader tape type, as illustrated in FIGS. 3 and 4, the hook member 17 is fitted securely in the cell. A hook 17-1 at the end of the hook member 17 projects toward the guide wall 19, exposing itself partly in the path of the leader tape.

On the other hand, the leader member-containing cell 11 is formed contiguous to the guide wall 19. It is formed away from the path in which the tape travels, lest the cell interfere with the running of the magnetic tape and the movement of the tape drawing-out member of a recorder. The adjoining end of the guide wall 19 extends over a part of the leader member-containing cell 11 to constitute a part of the wall of the cell. When the housing is to be built as one of the leader member type, as shown in FIGS. 5 and 6, one of the engaging members 92 of the leader member 9 that clamps an end of the magnetic tape on its center pin member 91 is fitted in the cell 11.

According to the present invention, as described above, both the cells for the hook member and the leader member are arranged along the path in which the tape travels. Thus one and the same housing serves the combined purpose of the leader member type and the leader tape type. This adds to the economy of cartridge manufacture, since a single mold can be utilized in making cartridges of the two types.

Next, referring to FIGS. 7 and 8, another embodiment of the invention will be described. In these figures the identical parts, excepting the portions surrounded by broken lines 200, 201, are the parts of two upper casings molded of plastic by mold parts common to both.

Figure 7:
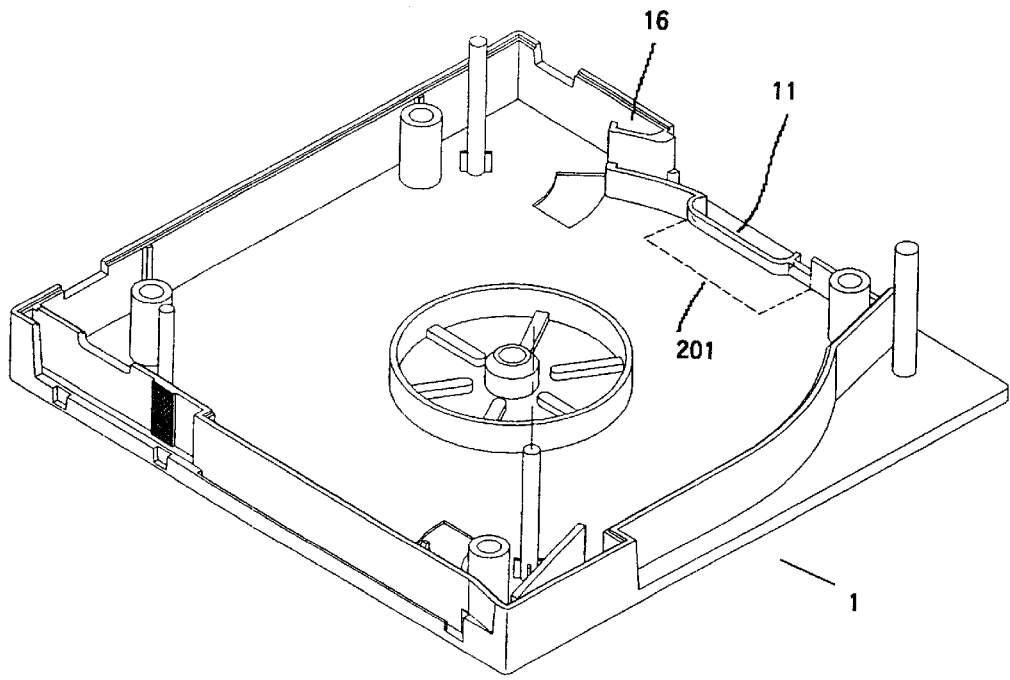
FIG. 7 is a perspective view of an upper casing made by a mold including a first replaceable mold part according to the invention.

In FIG. 7, the portion surrounded by the broken line 201 is a portion formed using a first replaceable mold part. This means that the upper casing 1 shown was made by a mold combining a common mold part and the first replaceable mold part. The first replaceable mold part has a mold cavity contour for forming a leader member-containing cell 11. In this manner a tape cartridge that can incorporate both the leader tape type and leader member type is provided.

Figure 8:
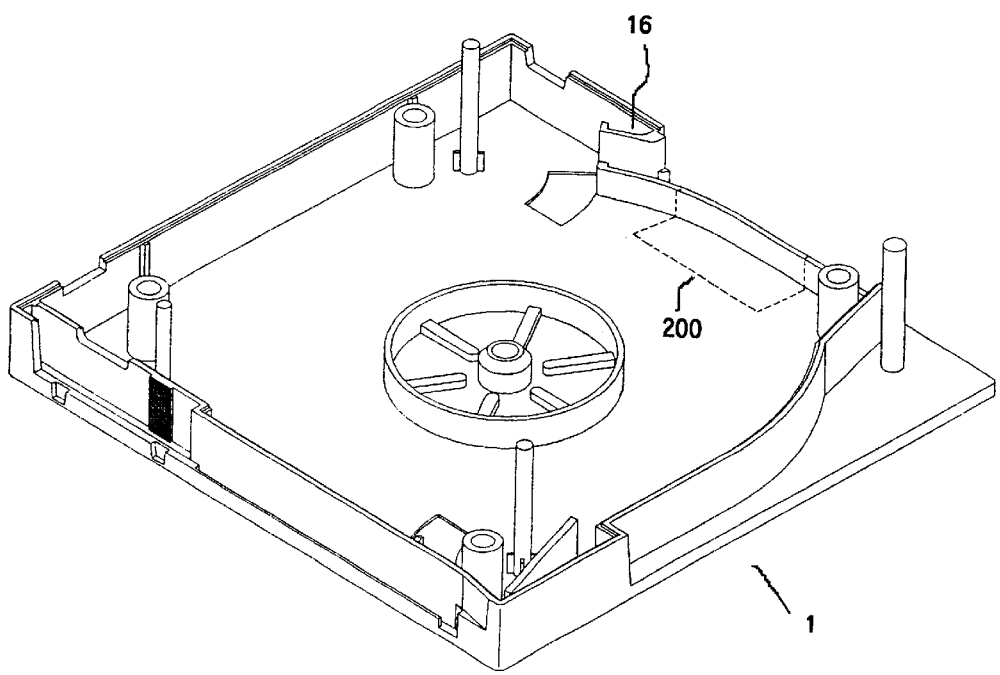
FIG. 8 is a perspective view of an upper casing made by a mold including a second replaceable mold part according to the invention.

Referring to FIG. 8, the portion surrounded by the broken line 200 is a portion formed using a second replaceable mold part. In other words the upper casing 1 shown was made by a mold combining a common mold part and the second replaceable mold part. The second replaceable mold part does not have a mold cavity contour for forming a leader member-containing cell; it simply forms a side wall as an uninterrupted extension of the guide wall. In this manner the upper casing permits the manufacture of a tape cartridge of the leader tape type.

Although the construction of the mold is not illustrated, the cavity surface of the mold has a shape complimentary to that of the molded product, and therefore the mold construction should be obvious to those skilled in the art from the foregoing description as well as from the illustrations.

As has been described, the present invention renders it possible to manufacture tape cassettes at lower cost than heretofore because it advantageously permits the production of cartridge housings with alternate tape drawing-out types, (1) housings combining the leader tape type and the leader member type and (2) housings that selectively use the leader tape type alone or combine the leader tape and leader member types.

What is claimed is:

1. A tape cartridge including a single tape reel around which a length of magnetic tape is wound and which is turnably held within a housing in such a manner that the beginning of the tape is drawn out through an opening formed in the housing by a tape drawing-out member of a recorder, said drawing-out member having an engaging means at the outer end, characterized in that the housing has both a cell in which a hook member to catch an engaging end of a leader tape, when the leader tape holding the beginning of the magnetic tape is used, is detachably fitted and a cell in which a leader member to hold the beginning of the magnetic tape, when the leader member is used, is contained.

* * * * *